United States Patent
Lu et al.

(10) Patent No.: US 12,294,790 B2
(45) Date of Patent: May 6, 2025

(54) IMAGING DEVICES WITH IMAGE TRANSFORM CIRCUITRY FOR IMPROVED MOTION DETECTION

(71) Applicant: SEMICONDUCTOR COMPONENTS INDUSTRIES, LLC, Scottsdale, AZ (US)

(72) Inventors: Alexander Lu, San Jose, CA (US); Kuang-Yen Lin, Taipei (TW)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 0 days.

(21) Appl. No.: 18/366,411

(22) Filed: Aug. 7, 2023

(65) Prior Publication Data

US 2023/0388670 A1    Nov. 30, 2023

Related U.S. Application Data

(63) Continuation of application No. 16/735,974, filed on Jan. 7, 2020, now Pat. No. 11,812,168.

(51) Int. Cl.
*H04N 25/50* (2023.01)
*G06T 7/00* (2017.01)
*G06T 7/262* (2017.01)

(52) U.S. Cl.
CPC ............. *H04N 25/50* (2023.01); *G06T 7/262* (2017.01); *G06T 7/97* (2017.01)

(58) Field of Classification Search
None
See application file for complete search history.

(56) References Cited

U.S. PATENT DOCUMENTS

| 4,797,742 A | 1/1989 | Sugiyama et al. |
| 5,262,871 A * | 11/1993 | Wilder .................. H04N 25/76 348/E3.018 |
| 6,625,214 B1 | 9/2003 | Umehara et al. |

(Continued)

FOREIGN PATENT DOCUMENTS

| CN | 108629312 A | 10/2018 |
| CN | 109005329 A | 12/2018 |

(Continued)

*Primary Examiner* — James M Hannett
(74) *Attorney, Agent, or Firm* — Treyz Law Group, P.C.; David K. Cole

(57) ABSTRACT

An imaging device may include an image sensor that generates frames of image data in response to incident light with an array of image pixels, and processing circuitry that processes the image data. The processing circuitry may include a transformation circuit that applies transforms to subsampled frames of image data that are generated using a subset of the image pixels to produce transform values, and a comparator circuit that compares the transform values. The processing circuitry may determine that motion has occurred between sequential frames if a difference between a first transform value corresponding to a first image frame and a second transform value corresponding to a second image frame exceeds a threshold value. In response to determining that motion has occurred, the image sensor may generate full-frame image data using all of the pixels of the array of image pixels.

19 Claims, 4 Drawing Sheets

(56) References Cited

U.S. PATENT DOCUMENTS

| | | | |
|---|---|---|---|
| 7,623,152 B1* | 11/2009 | Kaplinsky | H04N 23/69 |
| | | | 348/211.3 |
| 11,812,168 B2* | 11/2023 | Lu | H04N 25/50 |
| 2004/0105589 A1 | 6/2004 | Kawaharada et al. | |
| 2004/0190619 A1* | 9/2004 | Lee | H04N 5/145 |
| | | | 375/E7.115 |
| 2005/0074062 A1 | 4/2005 | Sung et al. | |
| 2009/0208062 A1 | 8/2009 | Sorek et al. | |

FOREIGN PATENT DOCUMENTS

| | | |
|---|---|---|
| EP | 2482225 A1 | 8/2012 |
| JP | H03111073 U | 11/1991 |
| JP | H04137685 U | 12/1992 |
| JP | H06105278 A | 4/1994 |
| JP | H06113279 A | 4/1994 |
| JP | 2005175710 A | 6/2005 |
| KR | 200309401 Y1 | 3/2003 |
| KR | 20040066397 A | 7/2004 |

* cited by examiner

IMAGING DEVICES WITH IMAGE TRANSFORM CIRCUITRY FOR IMPROVED MOTION DETECTION This application is a continuation of U.S. patent application Ser. No. 16/735,974, filed Jan. 7, 2020, which is hereby incorporated by reference herein in its entirety.

BACKGROUND

This relates generally to imaging devices, and more particularly, to imaging devices that include image sensors that capture image data and transformation circuitry for transforming the image data and improving motion detection capabilities.

Imaging devices are commonly included within electronic devices such as cellular telephones, cameras, and computers and include image sensors to capture images. In a typical arrangement, an image sensor includes an array of image pixels arranged in pixel rows and pixel columns. Column readout circuitry may be coupled to each pixel column for reading out image signals from the image pixels.

In some imaging devices, it may be desired to activate the image sensor and generate image data in response to detected motion. Motion detection is often performed using a passive infrared sensor. When the passive infrared sensor detects motion, it will wake a processing unit within the device to capture an image using the image sensor. However, passive infrared sensors are sensitive to heat movement, and any heat movement can cause the sensors to trigger, even in the absence of motion, causing the processing unit to trigger and consume energy when an image is taken.

It would therefore be desirable to be able to provide imaging devices with improved motion detection.

DETAILED DESCRIPTION

Embodiments of the present invention relate to imaging devices, and more particularly, to imaging devices having transformation circuitry to provide for improved motion detection. It will be recognized by one skilled in the art that the present exemplary embodiments may be practiced without some or all of these specific details. In other instances, well known operations have not been described in detail in order to not unnecessarily obscure the present embodiments.

Imaging systems having digital camera modules are widely used in electronic devices such as digital cameras, computers, cellular telephones, and other electronic devices. A digital camera module may include one or more image sensors that gather incoming light to capture an image. Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). Image sensors may include control circuitry such as circuitry for operating the image pixels and readout circuitry for reading out image signals corresponding to the electric charge generated by the photosensitive elements.

The imaging systems may also have processing circuitry. In some applications, such as in surveillance cameras, cameras configured to capture action shots (e.g., a camera with a sport detection mode), vehicular cameras, and other imaging devices, it may be desirable for the processing circuitry to include motion detection circuitry. In particular, the motion detection circuitry may apply a transform (such as a discrete cosine transform) to image data generated by the image sensor. By comparing values generated by the transform in sequential image frames, the processing circuitry may determine whether there has been motion between the image frames.

Figure 1:
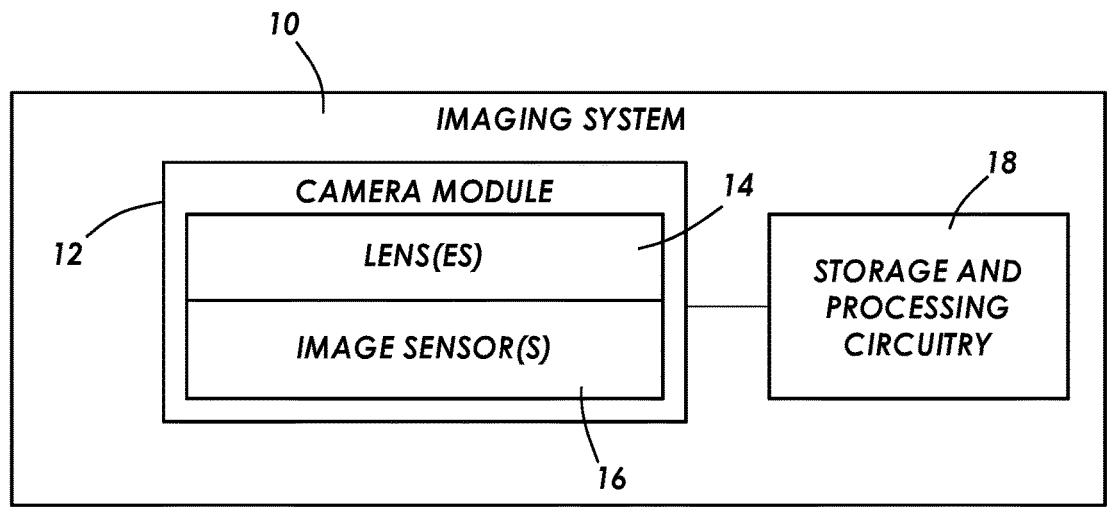
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, a surveillance camera that takes still images, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). In some embodiments, processing circuitry 18 may include motion detection circuitry that can analyze image frame data from image sensor 16 and determine whether motion has occurred between sequential image frames. If desired, processing circuitry 18 may activate and/or adjust image sensor 16 after determining that motion has occurred. Processed image data may, if desired, be provided to external equipment (e.g., a computer, external display, or other device) using wired and/or wireless communications paths coupled to processing circuitry 18.

Although processing circuitry 18 has been shown as separate from camera module 12, at least a portion of processing circuitry 18 may be included within camera module 12, if desired. Additionally or alternatively, a portion of processing circuitry 18 may be included within external equipment, such as an external computer, if desired.

Figure 2:
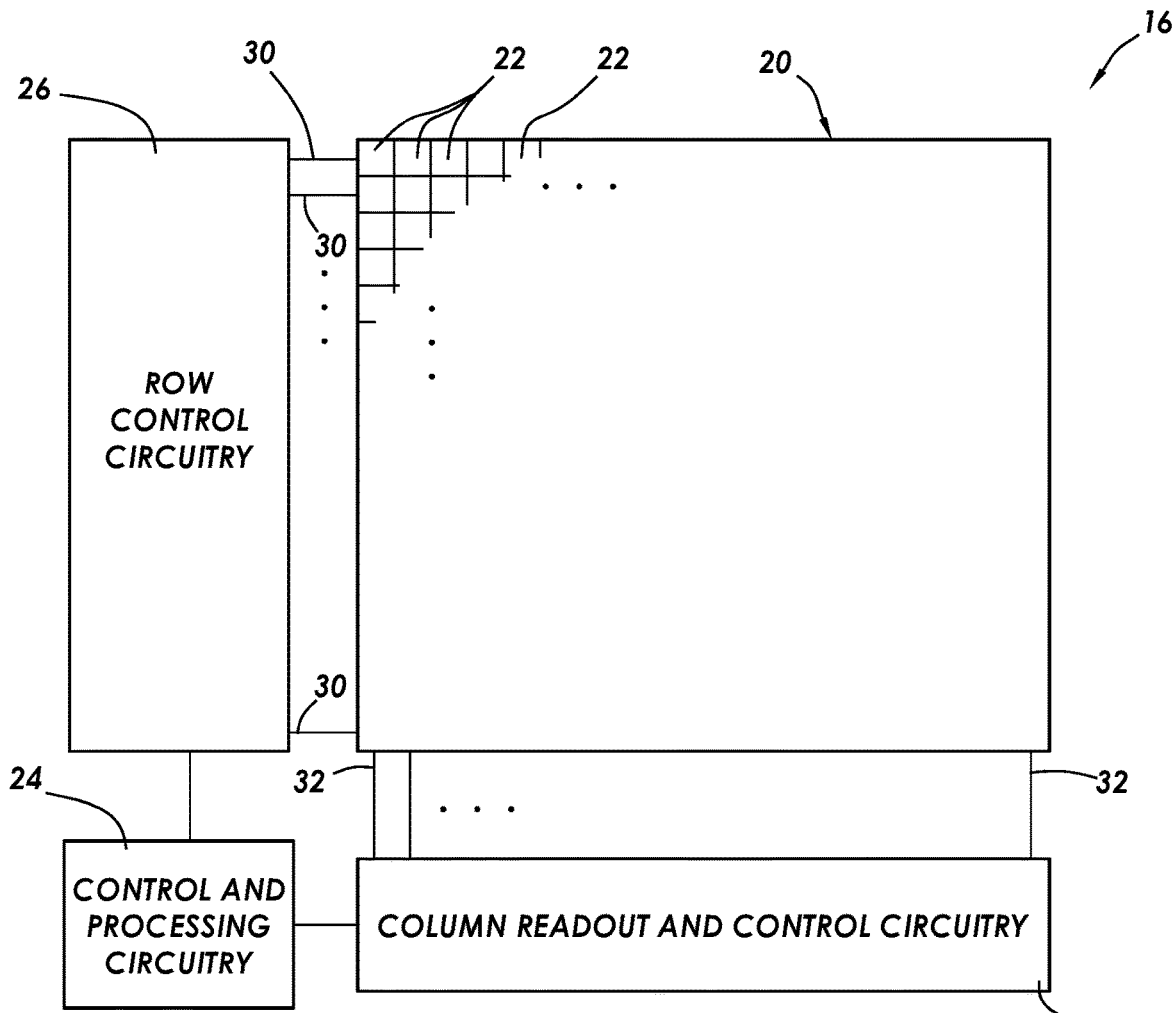
FIG. 2 is a diagram of an illustrative pixel array and associated readout circuitry for reading out image signals from the pixel array in accordance with an embodiment.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, column readout circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. These row control signals may be used to enable dual conversion gain operations within image sensor 16, if desired. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 (sometimes referred to as column readout and control circuitry 28) may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. Sample-and-hold circuitry in readout circuitry 28 may be used to read out charge generated by image pixels 22 using correlated double sampling operations. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) for pixels in one or more pixel columns.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

Image sensor 16 may be configured to support a global shutter operation (e.g., pixels 22 may be operated in a global shutter mode). For example, the image pixels 22 in array 20 may each include a photodiode, floating diffusion region, and local charge storage region. With a global shutter scheme, all of the pixels in the image sensor are reset simultaneously. A charge transfer operation is then used to simultaneously transfer the charge collected in the photodiode of each image pixel to the associated charge storage region. Data from each storage region may then be read out on a per-row basis, for example. However, this is merely illustrative. In general, any desired read sequence may be used. For example, a rolling shutter operation, a pipelined readout operation, a non-pipelined readout operation, or any other desired readout operation may be utilized.

In some embodiments, image sensor 16 may generate subsampled image data (e.g., image data generated using fewer than all of image pixels 22). For example, image sensor 16 may generate subsampled image data using only the green pixels of image pixels 22, only the red pixels of image pixels 22, only the blue pixels of image pixels 22, or any other desired subset of image pixels 22. For example, subsampled image data may be generated using every other image pixel of image pixels 22. Subsampled image data may be used by processing circuitry 18 to determine whether motion has occurred between subsampled image frames. In response to determining that motion has occurred, image sensor 16 may be activated to produce full-frame image data (e.g., image data generated using all image pixels within array 20). However, this is merely illustrative.

Figure 3:
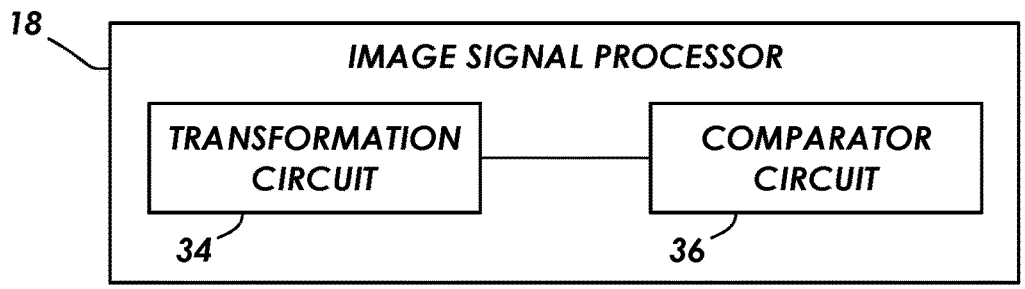
FIG. 3 is a diagram of an illustrative image signal processor having a transformation circuit and a comparator circuit in accordance with an embodiment.

As shown in FIG. 3, image signal processor 18 may include transformation circuit 34 and comparator circuit 36. Other circuitry may be included within image signal processor 18, but is not shown as not to obfuscate the drawing. Transformation circuit 34 and comparator circuit 36 may be used to perform motion detection using the image data produced by image sensor 16. In particular, transform circuit 34 may receive image data of a first image frame (e.g., a first subsampled image frame) from image sensor 16 and apply a transform to the image data, generating a first transform value. Transform circuit 34 may then receive image data of a second image frame (e.g., a second subsampled image frame) from image sensor 16 and apply the transform to the image data, generating a second transform value. Comparator circuit 36 may then compare the first transform value to the second transform value. If the difference between the first and second transform values is greater than a threshold value, processor 18 may determine that motion has occurred between the first and second image frames and activate/adjust image sensor 16 to, for example, capture one or more full image frames.

Transform circuit 34 may apply a discrete cosine transform to the image data generated by image sensor 16. For example, the discrete cosine transform may be given by Equation 1, $$F(u, v) = \left(\frac{2}{N}\right)^{\frac{1}{2}} \left(\frac{2}{M}\right)^{\frac{1}{2}} \sum_{i=0}^{N-1} \sum_{j=0}^{M-1} \Lambda(i) \cdot \Lambda(j) \cdot \cos\left[\frac{\pi \cdot u}{2 \cdot N}(2i+1)\right] \cos\left[\frac{\pi \cdot v}{2 \cdot M}(2j+1)\right] \cdot f(i, j) \quad (1)$$

where F(u,v) is the transform value in the frequency domain, N and M are the x and y dimensions of the image frame generated by image sensor 16, and f(i,j) is the image data generated by image sensor 16. In particular, transform circuit 34 may transform the image data across each entire image frame. In other words, transform circuit 34 may transform each N by M image frame produced by image sensor 16 (e.g., a subsampled image frame) into transform value F.

Using the discrete cosine transform of Equation 1, other cosine transform, or any other desired transform, transformation circuit 34 may generate a transform value for each image frame of data that is generated by image sensor 16, which may then be compared to the transform value of subsequent image frames. This may eliminate the need for a frame buffer to store a frame of image data (i.e., the transform value alone may be stored, rather than the frame of image data), thereby reducing the memory burden on processor 18 and increasing the frame rate of the imaging device. However, this is merely illustrative. A frame buffer may still be used, if desired.

As previously discussed, image sensor 16 may generate subsampled image data (e.g., image data generated using fewer than all of the pixels of array 20). This subsampled image data may be processed by transformation circuit 34 to generate the transform values that are compared by comparator circuit 36. If a difference between the transform values of sequential image frames is greater than a threshold value, processor 18 may determine that motion has occurred and activate/adjust image sensor 16 to generate full-frame image data (e.g., image data generated using all of the pixels of array 20).

Although transform circuit 34 and comparator circuit 36 have been shown to be within processor 18, this is merely illustrative. In general, transform circuit 34 and comparator circuit 36 may be contained within any desired portion of imaging system 10, whether inside of camera module 12 or outside of camera module 12.

Figure 4:
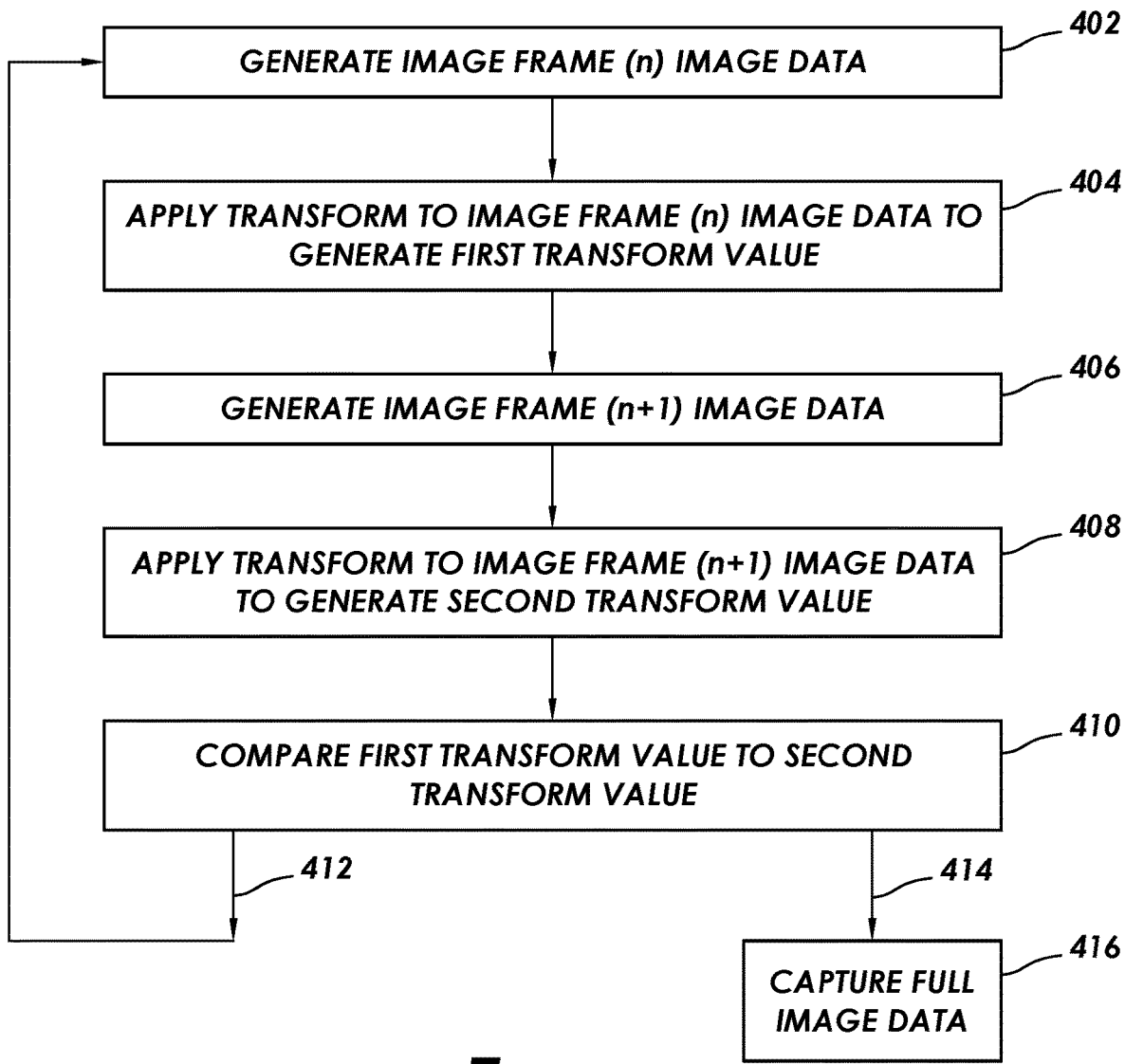
FIG. 4 is a flow chart of illustrative steps of operating the illustrative image sensor, transformation circuit, and comparator circuit of FIGS. 2 and 3 to detect motion in accordance with an embodiment.

A flowchart with illustrative steps to determine whether motion has occurred using processor 18 is shown in FIG. 4.

At step 402, image sensor 16 may generate image data of image frame (n) (e.g., a first image frame). As previously discussed, this may be subsampled image data, generated by fewer than all of the pixels of array 20. For example, only the green image pixels of array 20 may be used in generating the image data at step 402. However, this is merely illustrative. Any subset of pixels of pixel array 20 may be used to generate the image data, or the whole pixel array 20 may be used. However, it may be desirable to subsample the image data (using a subset of the pixels) to reduce the energy required to generate the image data.

At step 404, transformation circuit 34 may apply a transform to the image data of image frame (n) to generate a first transform value. The transform may be a discrete cosine transform, such as the discrete cosine transform of Equation 1, another cosine transform, or any other desired transform.

At step 406, image sensor 16 may generate image data of image frame (n+1) (e.g., a second image frame subsequent to the first image frame). As previously discussed, this may be subsampled image data, generated by fewer than all of the pixels of array 20. For example, only the green image pixels of array 20 may be used in generating the image data at step 402. However, this is merely illustrative. Any subset of pixels of pixel array 20 may be used to generate the image data, or the whole pixel array 20 may be used. However, it may be desirable to subsample the image data (using a subset of the pixels) to conserve the energy required to generate the image data. Image frame (n+1) may be sampled/subsampled using the same pixels as image frame (n), but this is merely illustrative. Image frame (n+1) may be sampled in any desired manner.

At step 408, transformation circuit 34 may apply a transform to the image data of image frame (n+1) to generate a second transform value. The transform may be a discrete cosine transform, such as the discrete cosine transform of Equation 1, another cosine transform, or any other desired transform.

At step 410, comparator circuit 36 may compare the first transform value to the second transform value. If a difference between the first transform value and the second transform value is less than a threshold value, processor 18 may determine that motion did not occur between image frame (n) and image frame (n+1), and the process may proceed along path 412. In this way, image sensor 16 may continuously produce image frames (such as subsampled image frames) that may be transformed and compared to the transform value of the previous image frame to determine whether motion has occurred. In particular, every image frame may be transformed and compared to the previous image frame, if desired.

If, on the other hand, the difference between the first transform value and the second transform value is greater than the threshold value, processor 18 may determine that motion did occur between image frame (n) and image frame (n+1), and the process may proceed along path 414 to step 416.

At step 416, processor 18 may send a control signal to image sensor 16 to capture a full image frame (e.g., image data generated by all of the pixels of array 20). In this way, image sensor 16 may produce subsampled image frames that can be transformed and compared to previous subsampled image frames by processor 18. Once processor 18 has determined that motion has occurred from a difference between the transform values, image sensor 16 may generate full-frame image data. A basis for this difference analysis is shown in FIG. 5.

Figure 5:
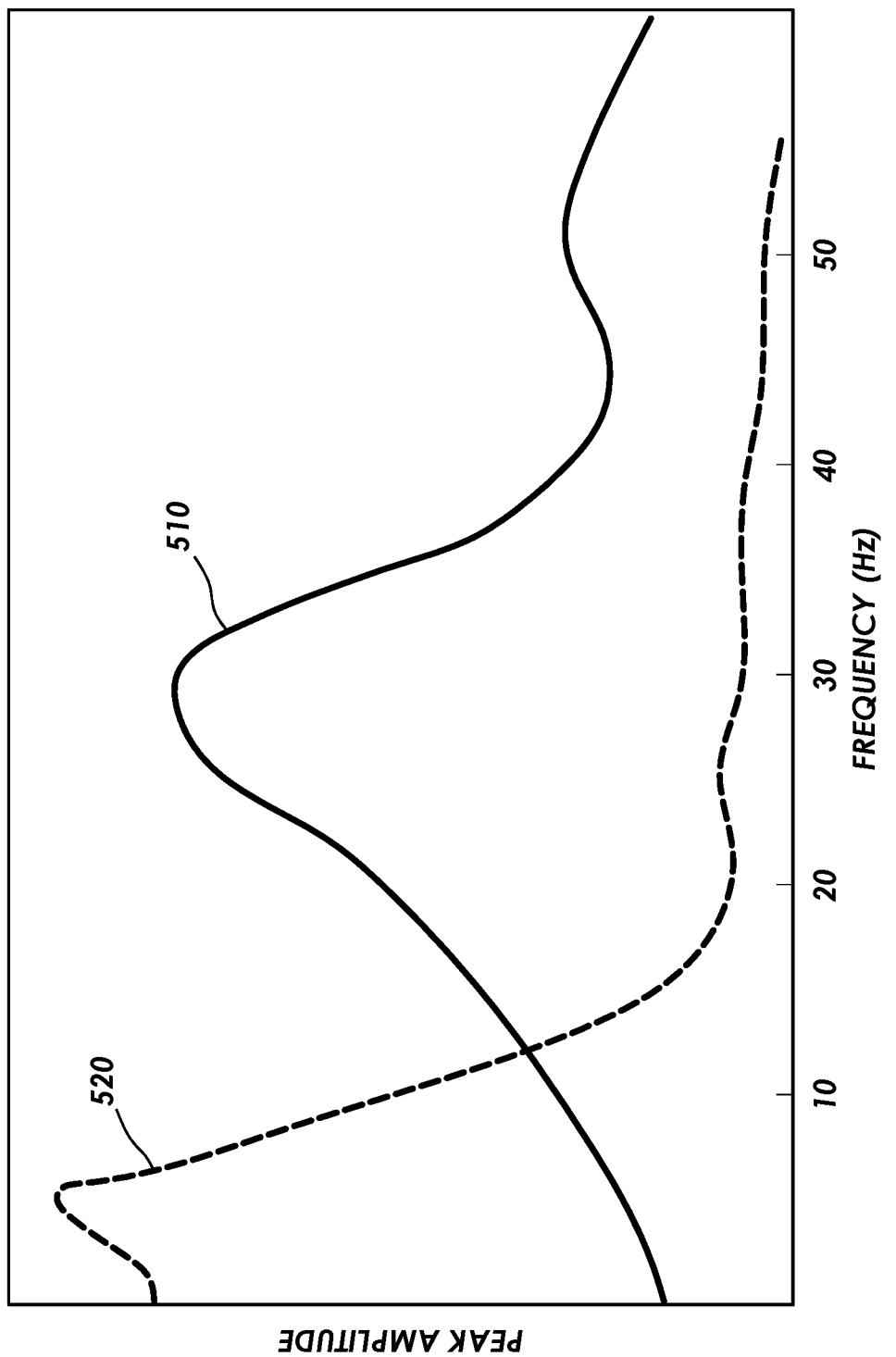
FIG. 5 is a graph of illustrative peak responses to motion and brightness changes in a transformed space at various frequencies in accordance with an embodiment.

In FIG. 5, an illustrative graph of peak amplitude of the difference in transform values in sequential image frames versus frequency is shown. In particular, the graph provides an illustrative absolute value of the peak difference between transform values (cosine functions) at each frequency (because the transform values are in the frequency domain—see Equation 1).

Curve 510 shows the peak difference at each frequency when movement occurs between sequential image frames. As shown by curve 510, there may be a peak in the transform value difference between approximately 15-30 Hz. However, this is merely illustrative. Movement between sequential image frames may cause a peak difference in transform values between 17-26 Hz, between 10-25 Hz, or any other range of frequencies.

Curve 520 shows the peak response at each frequency when brightness changes between sequential image frames. As shown by curve 520, there may be a peak in the transform value difference between 1-10 Hz. However, this is merely illustrative. In general, however, there is peak in transform value difference at a lower frequency range when there is a difference in brightness than when there is motion. Because of this, when comparing the difference between transform values, comparator circuit 36 may disregard the transform values at low frequency values, such as at 1-10 Hz, and instead focus on the transform values between 15-30 Hz, between 17-26 Hz, between 10-25 Hz, or other range of frequencies. In this way, a difference between transform values may indicate motion, instead of a mere change in brightness between image frames.

Figure 6:
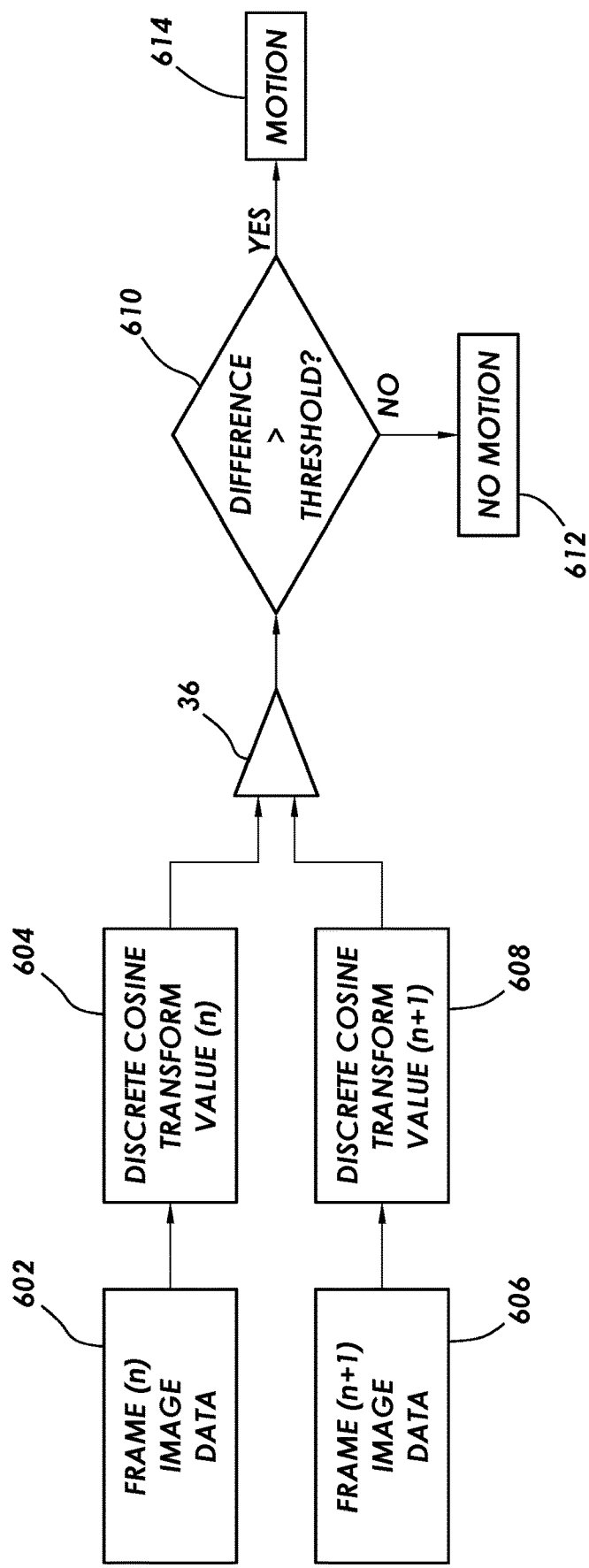
FIG. 6 is a chart of illustrative steps of using a discrete cosine transform on image data generated in sequential image frames to detect motion in accordance with an embodiment.

A chart of illustrative steps using the discrete cosine transform on image data of sequential image frames is shown in FIG. 6. As shown in FIG. 6, image data 602 of frame (n) (e.g., a first image frame) may be produced. This data may be produced by a subset of pixels of image sensor 16 or all of the pixels of image sensor 16. Image data 602 may be transformed using transformation circuit 34 into discrete cosine transform value (n) 604 (e.g., a first transform value). However, other transforms may be used by transformation circuit 34, if desired. After discrete cosine transform value 604 has been produced, processor 18 may discard image data 602, if desired. In this way, the need for a frame buffer may be eliminated, thereby reducing the memory requirements of motion detection. However, image data 602 may be stored in a frame buffer, if desired.

After image data 602 has been produced, image data 606 of frame (n+1) (e.g., a second image frame subsequent to the first image frame)) may be produced. This data may be produced by a subset of pixels of image sensor 16 or all of the pixels of image sensor 16. It may be desirable to produce image data 606 using the same pixels of image sensor 16 that generate image data 602, for example. However, any subset of image pixels may be used. Image data 606 may be transformed using transformation circuit 34 into discrete cosine transform value (n+1) 608. However, other transforms may be used by transformation circuit 34, if desired. After discrete cosine transform value 608 has been produced, processor 18 may discard image data 606, if desired. In this way, the need for a frame buffer may be eliminated, thereby reducing the memory requirements of motion detection. However, image data 606 may be stored in a frame buffer, if desired.

Comparator circuit 36 may then compare discrete cosine transform value 604 to discrete cosine transform value 608. As described above in connection with FIG. 5, comparator circuit 36 may compare the transform values between 15-30 Hz, between 17-26 Hz, between 10-25 Hz, or other desired range of frequencies. This may allow the processor to determine whether motion has occurred between the image frame (n) and image frame (n+1), while avoiding false positives due to brightness changes or other inconsistencies between image frames.

If comparator circuit 36 determines at block 610 that the difference between the transform values at a desired frequency or frequencies is below a threshold, processor 18 may determine that no motion has occurred between the image frames at block 612. The process may then continue, and image data from the next image frame (e.g., (n+2)) may be transformed and compared to transform value 608. In this way, the processor 18 may continuously compare image frames to determine whether motion has occurred.

If comparator circuit 36 determines at block 610 that the difference between the transform values at a desired frequency or frequencies is above a threshold, processor 18 may determine that motion has occurred between the image frames at block 614. Processor 18 may then instruct image sensor 16 to take a full-frame image (e.g., as opposed to the subsampled image frames that may be used for motion detection) in response to the detected motion.

Although the charts of FIGS. 4 and 6 end at the detection of motion, this is merely illustrative. In some embodiments, transform circuit 34 may transform the full-frame image data generated after detecting motion, and image sensor 16 may produce full-frame image data until motion is no longer detected (e.g., until a difference in transform values between full-frame image data is less than a threshold). At that point, image sensor 16 may proceed to produce subsampled image data until motion is again detected. However, imaging system 10 may be operated in any desired manner to detect motion and take appropriate action.

Various embodiments have been described illustrating imaging devices having transform and comparator circuitry to provide improved motion detection.

In various embodiments of the present invention, an imaging device that generates images in response to incident light may include an image sensor having an array of pixels that generate frames of image data in response to the incident light, and processing circuitry that processes the frames of image data. The processing circuitry may include a transformation circuit that transforms each frame of image data to produce a respective transform value, and a comparator circuit that compares each respective transform value to a transform value corresponding to a previous frame of image data.

In accordance with some embodiments, the transformation circuit may apply a discrete cosine transform to each frame of image data to produce the respective transform value.

In accordance with some embodiments, the image sensor may generate the frames of image data using a subset of pixels of the array of pixels.

In accordance with some embodiments, the imaging device may generate the frames of image data using only green pixels of the array of pixels.

In accordance with some embodiments, the processing circuitry may detect that motion has occurred between a first frame of image data having a first transform value and a second frame of image data having a second transform value in response to the comparator circuit determining that a difference between the first transform value and the second transform value exceeds a threshold value.

In accordance with some embodiments, the image sensor may produce a full-frame of image data using all of the pixels of the array of pixels in response to the processing circuitry determining that motion has occurred.

In accordance with some embodiments, the comparator circuit may compare the respective transform value to the transform value corresponding to the previous frame of image data (e.g., the first transform value to the second transform value) within a frequency range of 15-30 Hz.

In accordance with some embodiments, the imaging device may further include a camera module, and the image sensor, the transformation circuit, and the comparator circuit may be within the camera module.

In accordance with some embodiments, the imaging device may further include a camera module, the image sensor may be within the camera module, and the processing circuitry may be separate from the camera module.

In accordance with various embodiments, a method of operating an imaging device may include generating a first frame of image data with an image sensor, applying a transform to the first frame of image data with a transformation circuit to generate a first transform value, generating a second frame of image data with the image sensor, applying the transform to the second frame of image data with the transformation circuit to generate a second transform value, comparing the first transform value to the second transform value, and in response to determining that a difference between the first transform value and the second transform value exceeds a threshold value, generating full-frame image data with the image sensor.

In accordance with some embodiments, generating the first frame of image data and generating the second frame of image data may include generating a first subsampled frame of image data and generating a second subsampled frame of image data using a subset of image pixels of an array of image pixels in the image sensor.

In accordance with some embodiments, generating the first subsampled frame of image data and generating the second subsampled frame of image data using the subset of image pixels may include generating the first and second subsampled frames of image data using only green image pixels of the array of image pixels.

In accordance with some embodiments, generating the full-frame image data may include generating the full-frame image data using all of the image pixels of the array of image pixels in the image sensor.

In accordance with some embodiments, the method may further include after applying the transform to the first frame of image data to generate the first transform value, discarding the first frame of image data, and after applying the transform to the second frame of image data to generate the second transform value, discarding the second frame of image data.

In accordance with some embodiments, applying the transform to the first frame of image data and applying the transform to the second frame of image data may include applying a discrete cosine transform to the first frame of image data and to the second frame of image data.

In accordance with some embodiments, comparing the first transform value to the second transform value may include determining the difference between the first transform value and the second transform value within a frequency range of 15-30 Hz.

In accordance with some embodiments, the method may further include in response to determining that the difference between the first transform value and the second transform value does not exceed the threshold value, applying the transform to a third frame of image data with the transformation circuit to generate a third transform value, and comparing the third transform value to the second transform value.

In accordance with various embodiments, an imaging system may include an image sensor that includes an array of pixels. The image sensors sensor may generate frames of subsampled image data using a portion of the array of pixels and the image sensor may generate full-frame image data using the entire array of pixels. The imaging system may also include a transformation circuit that may transform the frames of subsampled image data to generate transform values, and a comparator circuit that may compare a first transform value corresponding to a first frame of subsampled image data to a second transform value corresponding to a second frame of subsampled image data. The image sensor may generate the full-frame image data in response to a difference between the first transform value and the second transform value exceeding a threshold value.

In accordance with some embodiments, the image sensor may generate the frames of subsampled image data using only green pixels of the array of pixels.

In accordance with some embodiments, processing circuitry may determine that motion has occurred between the first frame of subsampled image data and the second frame of subsampled image data based on the difference between the first transform value and the second transform value exceeding the threshold value.

The foregoing is merely illustrative and various modifications can be made to the described embodiments. The foregoing embodiments may be implemented individually or in any combination.

What is claimed is:

1. An imaging system, comprising:
    an image sensor comprising an array of pixels, wherein the image sensor is configured to capture frames of subsampled image data using a portion of the array of pixels and to capture full-frame image data using the entire array of pixels;
    a transformation circuit configured to transform the frames of subsampled image data to generate transform values; and
    a comparator circuit configured to compare a first transform value of the transform values corresponding to a first frame of subsampled image data to a second transform value of the transform values corresponding to a second frame of subsampled image data, wherein the image sensor is configured to switch from capturing the frames of subsampled image data using only a subset of pixels of the array of pixels to capturing the full-frame image data using the entire array of pixels in response to a difference between the first transform value and the second transform value exceeding a threshold value; and
    wherein the image sensor is further configured to switch from capturing the full-frame image data using the entire array of pixels to capturing the frames of subsampled image data using only the subset of pixels of the array of pixels in response to an additional difference between subsequent transform values being less than the threshold value.

2. The imaging system of claim 1, wherein the subset of pixels comprises only green pixels.

3. The imaging system of claim 1, further comprising:
    processing circuitry configured to determine that motion has occurred between the first frame of subsampled image data and the second frame of subsampled image data based on the difference between the first transform value and the second transform value exceeding the threshold value.

4. The imaging system of claim 3, wherein the image sensor is configured to capture the full-frame image data in response to the processing circuitry determining that the motion has occurred.

5. The imaging system of claim 1, wherein the transformation circuit is configured to transform the frames of subsampled image data using a discrete cosine transform.

6. The imaging system of claim 1, wherein the comparator circuit is configured to compare the first transform value to the second transform value within a frequency range of 15-30 Hz.

7. The imaging system of claim 1, further comprising:
a camera module, wherein the image sensor, the transformation circuit, and the comparator circuit are within the camera module.

8. The imaging system of claim 1, further comprising:
a camera module, wherein the image sensor is within the camera module and wherein the transformation circuit and the comparator circuit are separate from the camera module.

9. The imaging system of claim 1, further comprising:
processing circuitry configured to determine that motion has not occurred between subsequent frames of the full-frame image data based on the difference between the subsequent transform values being less than the threshold value.

10. An imaging device, comprising:
an image sensor having an array of pixels configured to generate frames of image data in response to incident light;
a transformation circuit configured to transform each frame of image data to produce a respective transform value; and
a comparator circuit configured to compare the respective transform value to a transform value corresponding to a previous frame of image data, wherein the image sensor is configured to switch between capturing subsampled image data using only a subset of pixels of the array of pixels and full-frame image data using the entire array of pixels in response to a difference between the respective transform value and the transform value corresponding to the previous frame of image data.

11. The imaging device of claim 10, wherein the image sensor is configured to switch from capturing the subsampled image data using only the subset of pixels of the array of pixels to capturing the full-frame image data using the entire array of pixels in response to the difference exceeding a threshold.

12. The imaging device of claim 11, wherein the image sensor is configured to switch from capturing the full-frame image data using the entire array of pixels to capturing the subsampled image data using only the subset of pixels of the array of pixels in response to the difference being less than the threshold.

13. The imaging device of claim 10, further comprising:
processing circuitry configured to determine whether motion has occurred between subsequent frames of the image data based on the difference.

14. The imaging device of claim 13, wherein the image sensor is configured to switch from capturing the subsampled image data using only the subset of pixels of the array of pixels to capturing the full-frame image data using the entire array of pixels in response to the processing circuitry detecting that motion has occurred.

15. The imaging device of claim 14, wherein the image sensor is configured to switch from capturing the full-frame image data using the entire array of pixels to capturing the subsampled image data using only the subset of pixels of the array of pixels in response to the processing circuitry detecting that motion has not occurred.

16. The imaging device of claim 10, wherein the transformation circuit is configured to transform each frame of the image data using a discrete cosine transform.

17. An image signal processor, comprising:
a transformation circuit configured to:
transform frames of subsampled image data to generate transform values, wherein the frames of subsampled image data are received from a subset of pixels in an array of pixels; and
a comparator circuit configured to compare a first transform value of the transform values corresponding to a first frame of image data to a second transform value of the transform values corresponding to a second frame of image data;
wherein the image signal processor is configured to send a control signal to capture full-frame image data based on a difference between the first transform value and the second transform value.

18. The image signal processor of claim 17, wherein the first and second frames of image data are first and second frames of subsampled image data, and
the control signal causes an image sensor to switch from capturing the frames of subsampled image data to capturing the full-frame image data in response to the difference exceeding a threshold value; and
the control signal causes the image sensor to switch from capturing the full-frame image data to capturing the frames of subsampled image data in response to the difference being less than the threshold value.

19. The image signal processor of claim 17, wherein the transformation circuit is further configured to transform full-frame image data after the difference between two of the generated transform values exceeds a threshold value, wherein the full-frame image data is received from a greater number of pixels than the subset.

* * * * *